(12) United States Patent
Szalwinski et al.

(10) Patent No.: US 6,240,427 B1
(45) Date of Patent: May 29, 2001

(54) METHOD AND APPARATUS FOR ARCHIVING AND DELETING LARGE DATA SETS

(75) Inventors: Bruce Szalwinski; F. Walter Smith, both of Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 0 days.

(21) Appl. No.: 09/225,394

(22) Filed: Jan. 5, 1999

(51) Int. Cl.[7] ........................................... G06F 12/00
(52) U.S. Cl. ................................. 707/204; 707/205
(58) Field of Search ............................. 707/204, 205

(56) References Cited

U.S. PATENT DOCUMENTS

| | | | |
|---|---|---|---|
| 5,155,835 | * | 10/1992 | Belsan ................................ 395/425 |
| 5,276,867 | * | 1/1994 | Kenley et al. ....................... 707/204 |
| 5,287,497 | * | 2/1994 | Behera ..................................... 707/3 |
| 5,448,718 | * | 9/1995 | Cohn et al. .......................... 395/404 |
| 5,513,112 | * | 4/1996 | Herring et al. ..................... 707/204 |
| 5,617,566 | * | 4/1997 | Malcolm .............................. 707/204 |
| 5,625,816 | * | 4/1997 | Burdick et al. ..................... 707/103 |
| 5,642,505 | * | 6/1997 | Fushimi ............................... 707/204 |
| 5,649,158 | * | 7/1997 | Lahr et al. .......................... 395/488 |
| 5,664,186 | * | 9/1997 | Bennett et al. ..................... 707/204 |
| 5,751,997 | * | 5/1998 | Kullick et al. ..................... 707/204 |
| 5,764,972 | * | 6/1998 | Crouse et al. .......................... 707/1 |
| 5,832,523 | * | 11/1998 | Kanai et al. ........................ 707/204 |
| 5,890,163 | * | 3/1999 | Todd .................................... 707/200 |
| 5,953,729 | * | 9/1999 | Cabrera et al. ..................... 707/204 |
| 5,956,733 | * | 9/1999 | Nakano et al. ...................... 707/204 |
| 5,978,477 | * | 11/1999 | Hull et al. ............................... 380/9 |
| 6,003,044 | * | 12/1999 | Pongracz et al. ................... 707/204 |

* cited by examiner

*Primary Examiner*—Thomas Black
*Assistant Examiner*—Frantz Coby
(74) *Attorney, Agent, or Firm*—Williams, Morgan & Amerson (57) ABSTRACT

The present invention provides for a method of archiving data files. A command to begin archiving is received. An archiving process is initiated in response to said command to begin archiving. An archiving write phase is implemented in response to said initiation of said archiving process. An archived-file deleting process is implemented in response to a completion of said archiving write phase.

24 Claims, 7 Drawing Sheets

METHOD AND APPARATUS FOR ARCHIVING AND DELETING LARGE DATA SETS

BACKGROUND OF THE INVENTION

1. Field of the Invention

This invention relates generally to data management, and, more particularly, to archiving and deleting large data sets.

2. Description of the Related Art

New developments in the arena of manufacturing processes have brought forth the need for complex and innovative methods of tracking and documenting the many steps involved in such processes. Today's manufacturing processes, particularly semiconductor manufacturing processes, call for a large number of important steps. These process steps are usually vital; therefore, a large number of data files are generated in order to properly document the process steps.

The manufacture of semiconductor devices requires a number of discrete process steps to create a packaged semiconductor circuit device from raw semiconductor material. The various processes, from the initial melt and refinement of the semiconductor material, the slicing of the semiconductor crystal into individual wafers, the fabrication stages (etching, doping, ion implanting, or the like), to the packaging and final testing of the completed device, are so different from one another and specialized that the processes may be performed in different facilities in remote regions of the globe.

For example, the process of growing and refining a large semiconductor crystal (e.g., Si, GaAs, or the like) may be performed by a foundry specializing in such crystal growth techniques. The resultant crystals may then be sold directly to a semiconductor manufacturer, either as large crystals, or as wafers sliced from a large crystal.

The semiconductor manufacturer may then slice the semiconductor crystal into wafers, if the semiconductor material is not already in wafer format. The semiconductor manufacturer then fabricates semiconductor circuit devices (e.g., microprocessor, DRAM, ASIC, or the like) on individual wafers, usually forming a number of devices on each wafer. The individual fabrication (or "FAB") processes include photolithography, ion implantation, and other associated FAB processes known in the art. Typically, the resultant semiconductor device is tested on the wafer during and after the FAB process.

Once the semiconductor devices have been fabricated and tested on the wafer, the wafer is sliced into individual semiconductor chips and packaged. The packaging process includes mounting and wire-bonding the individual chips to chip carriers (e.g., PLCCs, DIPs, CER-DIPs, surface mount carriers, or the like) and final testing of the resultant packaged semiconductor device. This packaging process is fairly labor intensive, and thus it may be desirable to perform the mounting, wire-bonding, and final testing at an offshore facility where labor rates may be cheaper. Once completed, the packaged semiconductor device may again be tested, and then labeled and shipped to customers through a distribution system.

One problem that arises in the current manufacturing-data management techniques is that the various processes take place at different discrete locations. Thus, it is difficult to track a semiconductor device through the fabrication process from single crystal to finished product. Such tracking may be useful for quality control purposes in order to determine the causes of product problems that may result in low yields or circuit defects. Tracking data files that correspond to all of the steps in the fabrication process, and managing those data files, is a very difficult task.

Another problem with current methods of storing data files is that a large amount of resources is required to store, archive, and retrieve data. The data storage methods used in the industry presently can cause problems during the storage and archiving process. Often, archiving of data files is performed by a process that generally runs through several manufacturing areas, one after another. Many times, a problem in one of the manufacturing areas can cause the archiving process to inadvertently skip a manufacturing area. Many times, an archiving process may not reach the end of the list of the manufacturing areas that contain files slated for archival. Furthermore, the current archiving process may not be able to finish archiving all of the files from the different manufacturing areas due to a lack of allotted time.

The resource-capacity of the data systems that track and archive data files generated by manufacturing processes are challenged by the task of archiving the enormous amounts of data files that must be tracked. Today's more sophisticated manufacturing processes generate more data files than ever before. Database software programs that are commonly used require vast amounts of computer resources for archiving. For example, the database software, Oracle® employs a read consistent view, which does not make data file manipulation steps permanent until they are committed. Software applications that employ the read consistent view, or other similar features, create a rollback segment, which keeps track of the steps performed during data file manipulation. The rollback segment feature utilizes a huge amount of computer resources. A method and an apparatus that performs archiving functions on large amounts of data, yet limits the utilization of computer resources, is needed.

The present invention is directed to overcoming, or at least reducing the effects of, one or more of the problems set forth above.

SUMMARY OF THE INVENTION

In one aspect of the present invention, a method of archiving data files is provided. A command to begin archiving is received. An archiving process is initiated in response to said command to begin archiving. An archiving write phase is implemented in response to said initiation of said archiving process. An archived-file deleting process is implemented in response to a completion of said archiving write phase.

In another aspect of the present invention, an apparatus for archiving data is provided. The apparatus of the present invention comprises: an archiver; an archiving write control; an archiving delete control; means for receiving a command to begin archiving; means of initiating an archiving process in response to said command to begin archiving; means for implementing an archiving write phase in response to said initiation of said archiving process; and means for implementing an archiving delete phase in response to a completion of said archiving write phase.

BRIEF DESCRIPTION OF THE DRAWINGS

The invention may be best understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1:
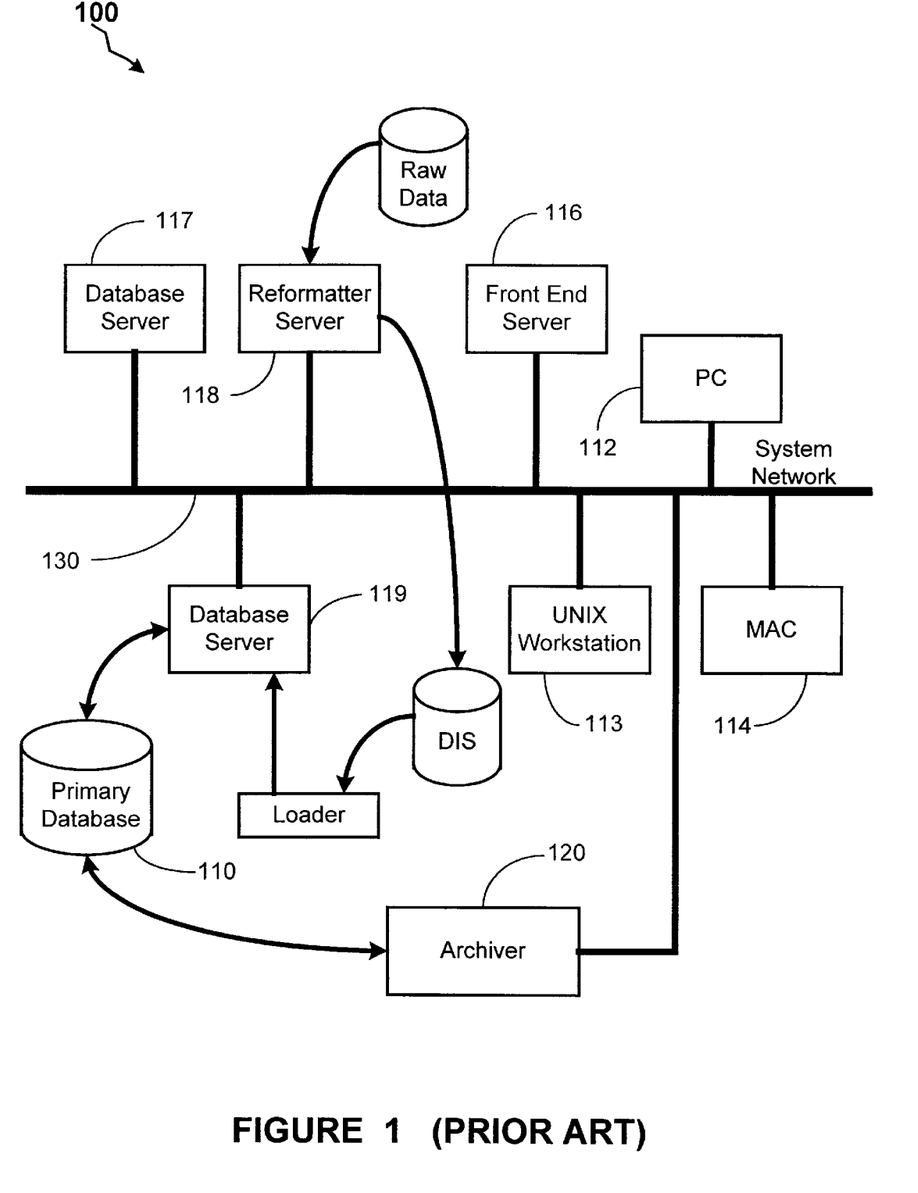
FIG. 1 illustrates a prior art system for acquiring and storing data relating to manufacturing processes.

The storing, archiving, and retrieving of data is very important in the area of high-technology manufacturing, particularly in the area of semiconductor manufacturing. Scores of data files from many steps in the processes of semiconductor manufacturing are stored and archived for later retrieval. The present invention provides an apparatus and a method for archiving and deleting large amounts of data in an efficient manner. In one embodiment, the data that is archived is received from any data source, such as a large database. One such source is a data collecting, storing, and retrieving system that generates a primary database, and is described in U.S. Pat. No. 5,625,816, which is hereby incorporated by reference in its entirety. FIG. 1 illustrates the prior art data collecting, storing, and retrieving system that is described by U.S. Pat. No. 5,625,816. FIG. 1 depicts a system 100 that includes a system network 130, which communicates with several servers 112, 113, 114 and computers 116, 117, 118, 119 that keep track of the many steps in a manufacturing process. The system 100 includes a primary database 110, which manages the data files generated during the manufacturing processes. The system 100 also includes an archiver 120, which manages the archiving of the data files generated during the manufacturing processes. The method and apparatus described by the present invention relates to the interaction between the primary database 110 and the archiver 120.

Figure 2:
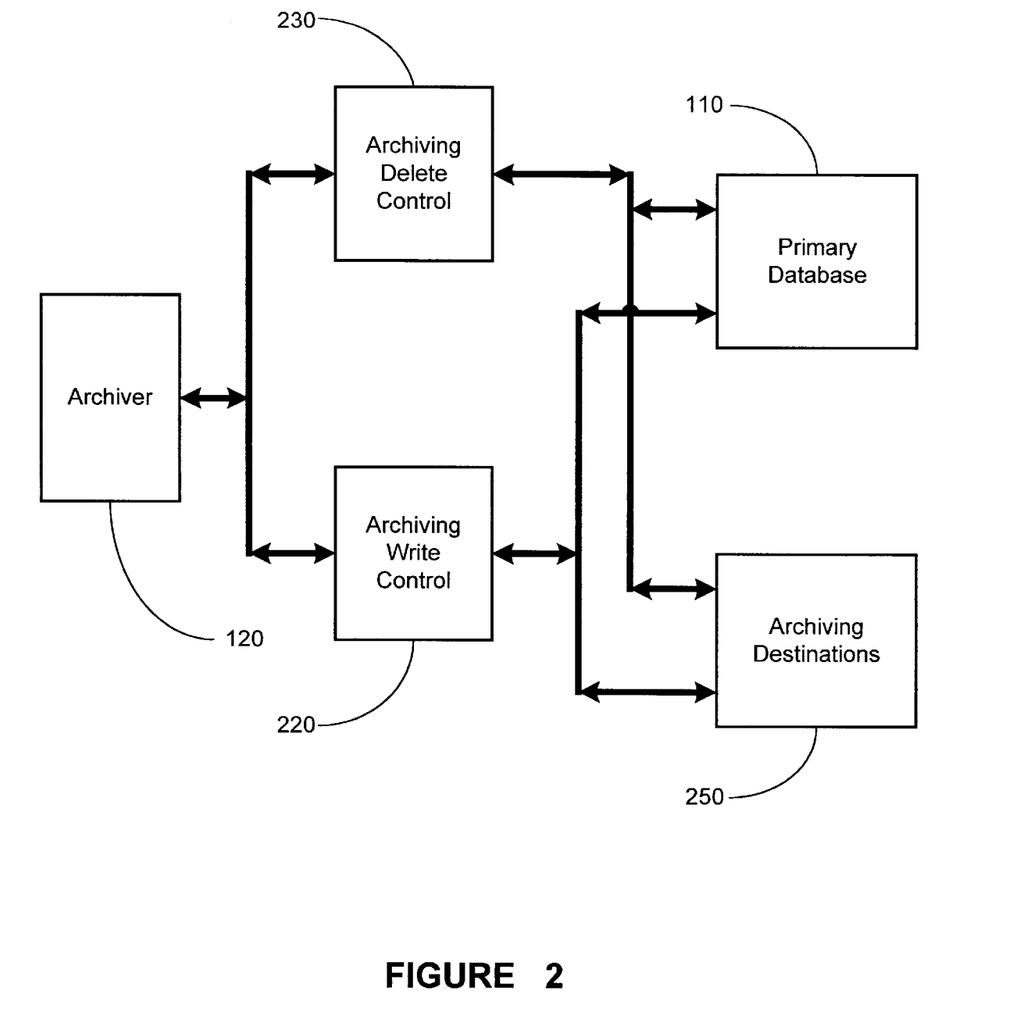
FIG. 2 is block-diagrammed representation of the archiving and deleting processes taught by the present invention.

The present invention teaches a method for archiving data efficiently such that data is read, written, and then deleted from the original location. The writing of the data being archived and the deletion of the data are performed in separate and independent processes, thereby creating safeguards against data loss, and improving efficiency. Turning now to FIG. 2, a block-diagrammed representation of the present invention is illustrated. FIG. 2 illustrates an archiver 120, which, in one embodiment, reads data files from the primary database 110 and archives them into the archiving destinations 250. The actual archiving of the data files from the primary database 110 to the archiving destinations 250 can be performed using one of a number of archiving methods. One such archiving method is described in U.S. patent application Ser. No. 09/225,438, filed on Jan. 5, 199, entitled "Method and Apparatus for Parallel Processing for Archiving and Retrieval of Data", now U.S. Pat. No. 6,078,933, which is hereby incorporated by reference in its entirety, and is subject to a common assignee.

The archiver 120 interfaces with the archiving write control 220. The archiving write control 220 reads data files that are slated to be archived from the primary database 110, and archives them into the archiving destinations 250. In a separate independent function, the archiver 120 deletes the archived data from the primary database 110 by utilizing the archiving delete control 230. The present invention teaches a method of reading data from a subset of a manufacturing lot stored in the primary database 110, writing the data files into archiving destinations 250, and deleting the data files from the primary database 110 once the data files for the entire set of the manufacturing lot have been archived. The archiver 120 directs the archiving write control 220 to read data files from the primary database 110 relating to a subset of the manufacturing lot that was chosen for archiving. The archiving write control 220 then writes the data portion that was read into the archiving destinations 250. Once all of the portions of data from an entire manufacturing lot have been archived, the archiver 120 directs the archiving delete control 230 to delete the data files from the primary database 110. In one embodiment, the archiver 120, the archiving write control 220, and the archiving delete control 230 are software entities. In alternative embodiments, the archiver 120, the archiving write control 220, and the archiving delete control 230 are hardware or firmware entities.

In one embodiment, a large database program, such as Oracle®, is used to manage the data in the primary database 110. Large database programs such as Oracle® employ a read consistent view concept. The read consistent view allows for consistent view of data in a database at multiple terminals, even if some of the data is modified or deleted at one terminal. When data in a database is modified or deleted at one terminal, other terminals viewing the database will not detect the alteration to the data until the modification or deletion transaction is committed. To maintain a read consistent view, as the rows of data are altered, a rollback segment is maintained. The rollback segment is a storage mechanism that logs all of the data-alteration steps performed on the database. The rollback segment is difficult to maintain and requires a large amount of resources. The present invention teaches a method of separating the archiving function into a read/write function and a delete function. Performing the read and write functions in an incremental fashion, i.e., reading and writing data files relating to subsets of a manufacturing area instead of an entire set of data, reduces the size of the rollback segments, thereby reducing the resources needed to maintain the rollback segments.

For example, in one embodiment, data files could be archived according to test numbers for a semiconductor wafer lot. In a case where there are ten test numbers in a lot, data from test number one is read and written to a storage file in the archiving destination 250, then data from test number two is read and written to a storage file, and so on until data from all of the tests are stored. Then in a separate transaction, the position of the data files corresponding to test number one is located in the primary database 110 and deleted. This process is repeated until all of the data files that have been backed up have been deleted from the primary database 110. The increment method of reading, writing, and deleting archived data files results in improved safety because no files are deleted until the entire set of data files for a lot have been archived. The present invention facilitates commits between deletion of files, thereby reducing the overhead required in the rollback segments. Furthermore, the method provided by the present invention reduces the amount of resources required to archive large data sets, and allows for improved efficiency because the delete process can be implemented during a period of time when computer resources are at its lowest utilization levels.

Figure 3:
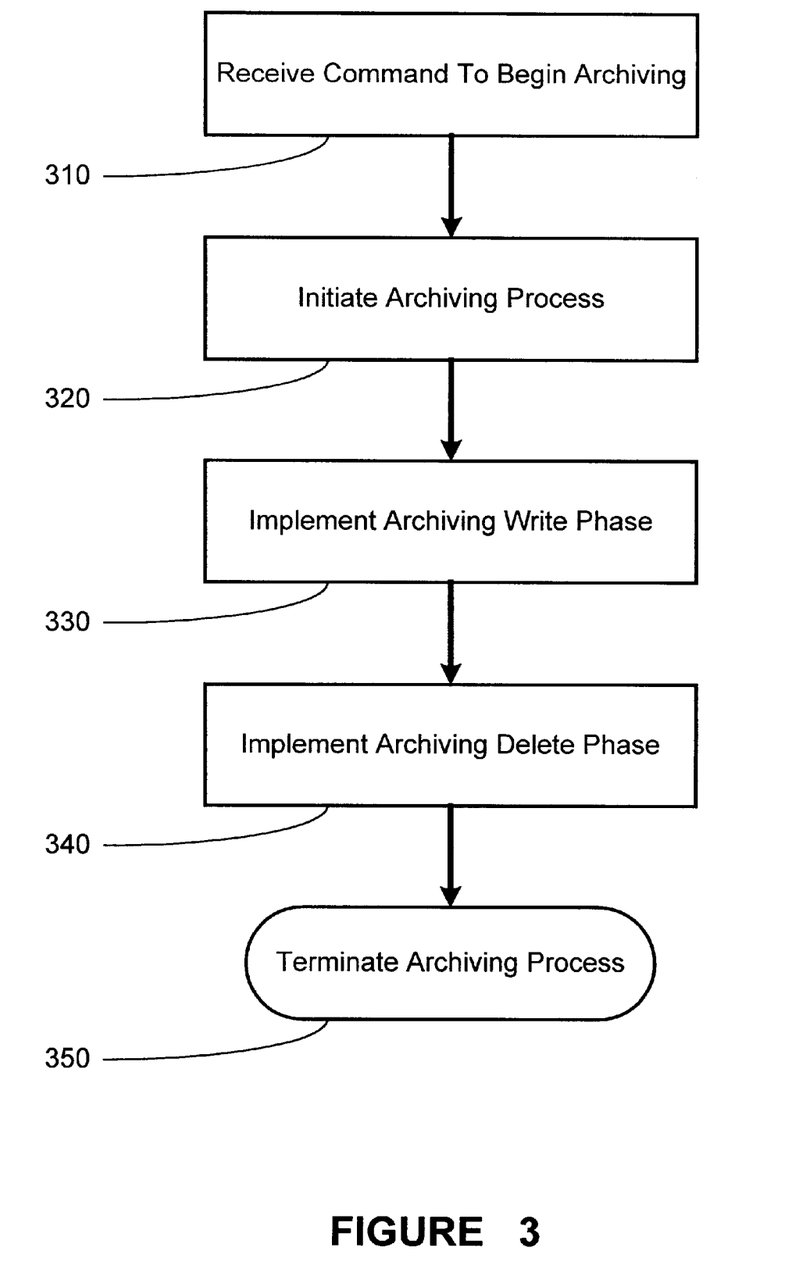
FIG. 3 depicts one illustrative embodiment of the method of the present invention, relating to archiving and deleting data, depicted in a flowchart form.

The method taught by the present invention is described in the flowchart that is illustrated in FIG. 3. Turning now to FIG. 3, the archiver 120 receives a command to begin archiving, as described in block 310. The archiver 120 then initiates an archiving process upon receipt of the command to begin archiving, as described in block 320. In one embodiment, the archiver function is implemented during non-peak periods of time, where utilization of computer resources is at a minimum. The archiver 120 then implements the archiving write phase by prompting the archiving write control 220 to begin archiving, as described in block 330.

Figure 4:
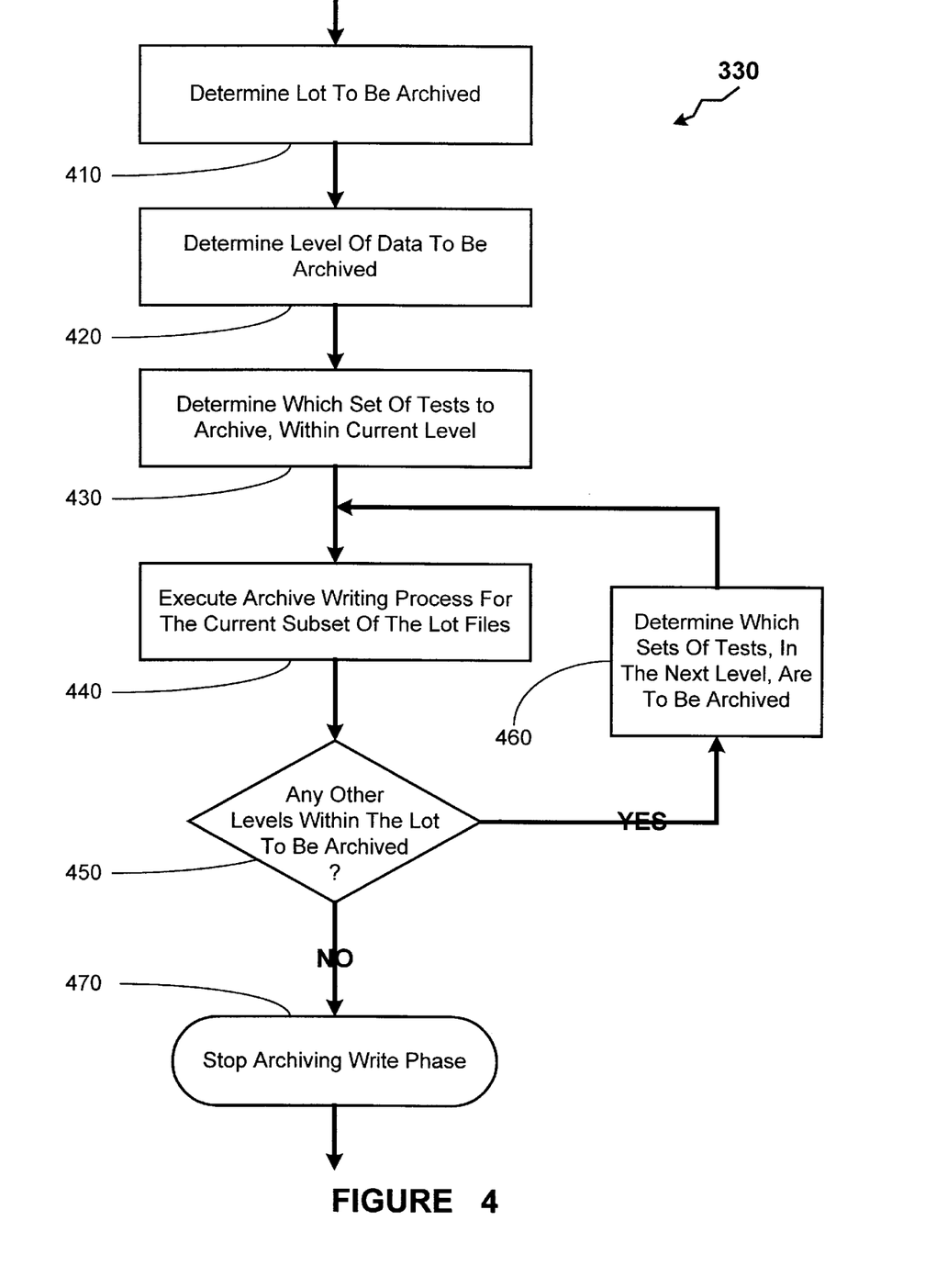
FIG. 4 depicts a more detailed illustrative embodiment of an archiving write phase described in FIG. 3.

The implementation of the archiving write phase, described in block 330 of FIG. 3, is illustrated in further detail in FIG. 4. Turning now to FIG. 4, the manufacturing lot that contains files slated to be archived is determined, as described in block 410. In one embodiment, an archiving list, which contains data files generated during the manufacturing process of a semiconductor wafer lot, is created. When the archiving process is initiated, in one embodiment, the data files to be archived are selected from the archiving list in a chronologically sequential manner. Once the manufacturing lot to be archived is selected, the level of data to be archived is determined, as described in block 420. Often, there are multiple levels of data associated with a manufacturing lot. One example is raw data, which may include manually keyed data generated by production employees or production engineers. The manufacturing lot may also contain reformatted data that has been standardized into a format commonly known in the industry as Data Input Standard (DIS). Different levels of data may have different retention times, or some levels of data may not be archived at all. Therefore, the level of data that is to be archived is predetermined before the actual storing of data files commences.

Once the level of the data that is to be archived is selected, a determination is made as to which set of tests relating to the particular level of data is to be archived, as described in block 430 of FIG. 4. Generally, for a specified manufacturing lot at a particular data level, a number of different tests are performed, and data associated with these tests are collected and stored. In some embodiments, hundreds of tests are performed at an associated data level. The data files resulting from the tests are selected for archival. In some embodiments, the data files resulting from all of the tests at a particular data level are archived. In one embodiment, a data query is executed to find and tag all of the data files from the tests that are to be archived. At this point, data files associated with a subset of the manufacturing lot have been narrowed to a particular manufacturing lot, further narrowed to a particular data level within the manufacturing lot, and finally narrowed even more to the set of tests within a particular level. When the data files associated with a subset of a manufacturing lot is selected for archival, the archiving write process for the current subset of lot files is executed, as described in block 440.

Figure 5:
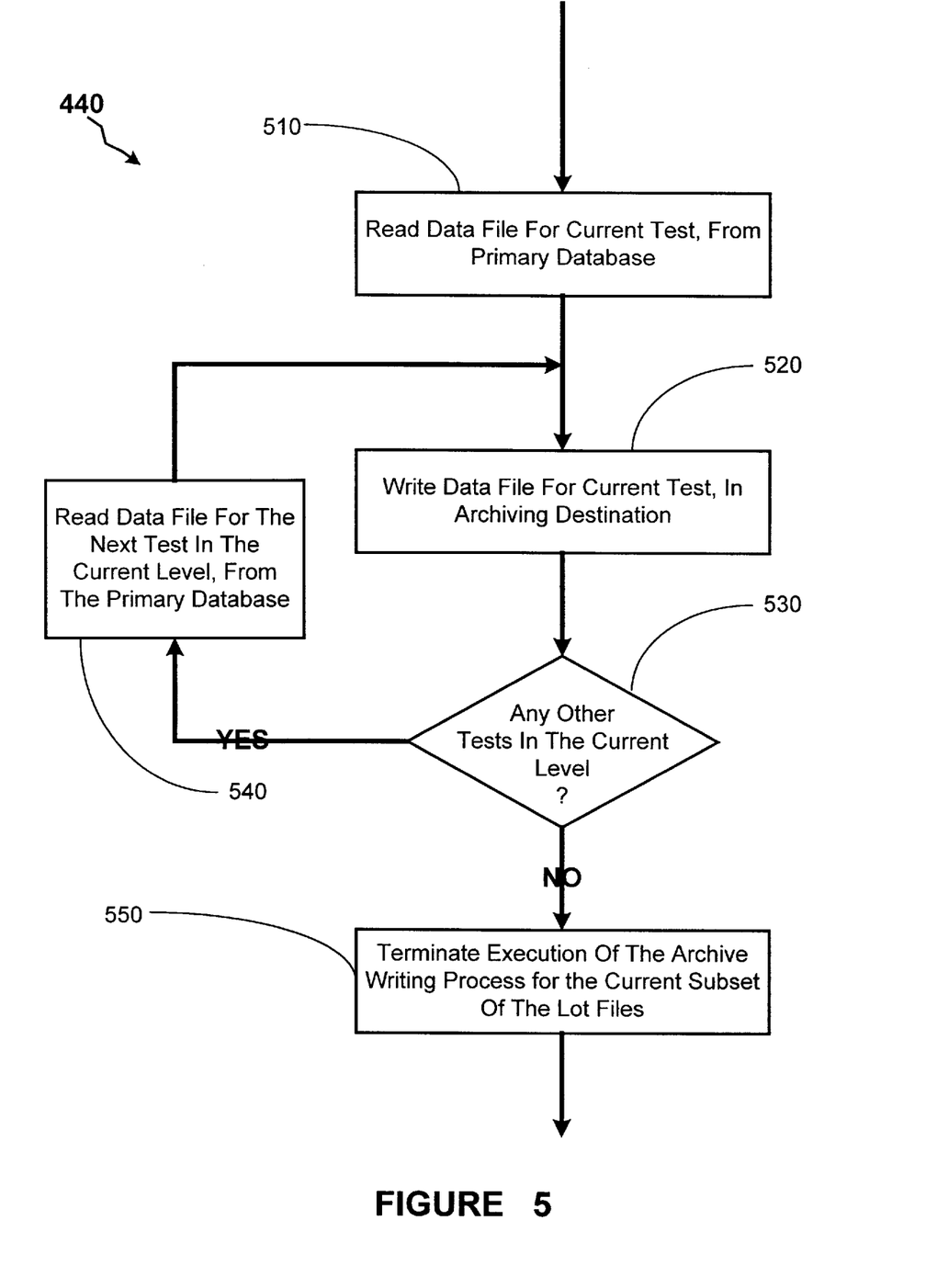
FIG. 5 depicts a more detailed illustrative embodiment of the archive writing process described in FIG. 4.

The execution of the archiving write process for the current subset of lot files, described in block 440 of FIG. 4, is illustrated in further detail in FIG. 5. In one embodiment, the current subset of lot files includes data files corresponding to all of the tests in one particular data level within the selected lot that is being archived. Turning now to FIG. 5, the data files associated with the currently selected test in the predetermined data level is read from the primary database 110, as described in block 510. Once the data files associated with the currently selected test are read, the data files are written into the appropriate archiving destinations 250, as described in block 520. The archiver 120 then determines whether there are any other data files corresponding to other tests that have not been archived in the data level under consideration, as described in block 530. In one embodiment, one level of data under consideration may include approximately one hundred tests. Often, the data files corresponding to substantially all of the tests within a data level are archived.

When the archiver 120 determines that there exists data files corresponding to other tests in the current level, the archiver 120 reads the data file corresponding to the next test in the current level from the primary database 110, as described in block 540 of FIG. 5. The archiver 120 then writes the data file corresponding to the next test in the current level into the archiving destinations 250, and checks to determine whether data files corresponding to another test is to be archived. The function loop consisting of blocks 520, 530, and 540 is continuously repeated until data files corresponding to all of the tests within the current data level, which were pre-selected for archiving, have been archived. When the archiver 120 determines that there are no other data files corresponding to any other tests that were preselected for archiving, the archiver 120 terminates the execution of the archive writing process for the current subset of lot files, as described in block 550 of FIG. 5. The conclusion of the step described in block 550 of FIG. completes the execution of the archiving writing process for the current subset of the lot files, described in block 440 of FIG. 4.

Turning back to FIG. 4 and continuing the archiving write phase, the archiver 120 determines whether there are any other data levels within the selected lot to be archived, as described in block 450. When the archiver 120 determines that there are other data levels within the lot selected for archiving, the archiver 120 checks to determine which set of tests within the next data level are to be archived, as described in block 460. The archiver 120 then executes the archiving writing process (block 440) on data files from the test within the next data level. The archiver 120 subsequently checks for other data levels slated to be archived. The function loop of checking for new data levels to archive, determining the test within the data levels to archive, and executing the archiving writing process, as described by blocks 440, 450, and 460, is continuously repeated until all data levels within the lot selected for archiving are written into the archiving destinations 250. When the archiver 120 determines that there are no other data levels within the selected lot to be archived, the archiver 120 stops the archiving write phase, as described in block 470. The stopping of the archiver write phase, described in block 470 of FIG. 4, concludes the implementation of the archiving write phase described in block 330 of FIG. 3.

Turning back to FIG. 3, upon the completion of the implementation of the archiving write phase, the archiver 120 implements the archiving delete phase, as described in block 340. The archiving delete phase can be implemented at any time after the archiving write phase. In one embodiment, the archiving delete phase deletes, from the primary database 110, the data files that have been archived into the archiving destinations 250. In one embodiment, the archiving delete phase is implemented during periods of time when use of computer resources is at a minimum. The archiving delete phase, described in block 340 of FIG. 3, is illustrated in further detail in FIG. 6.

Figure 6:
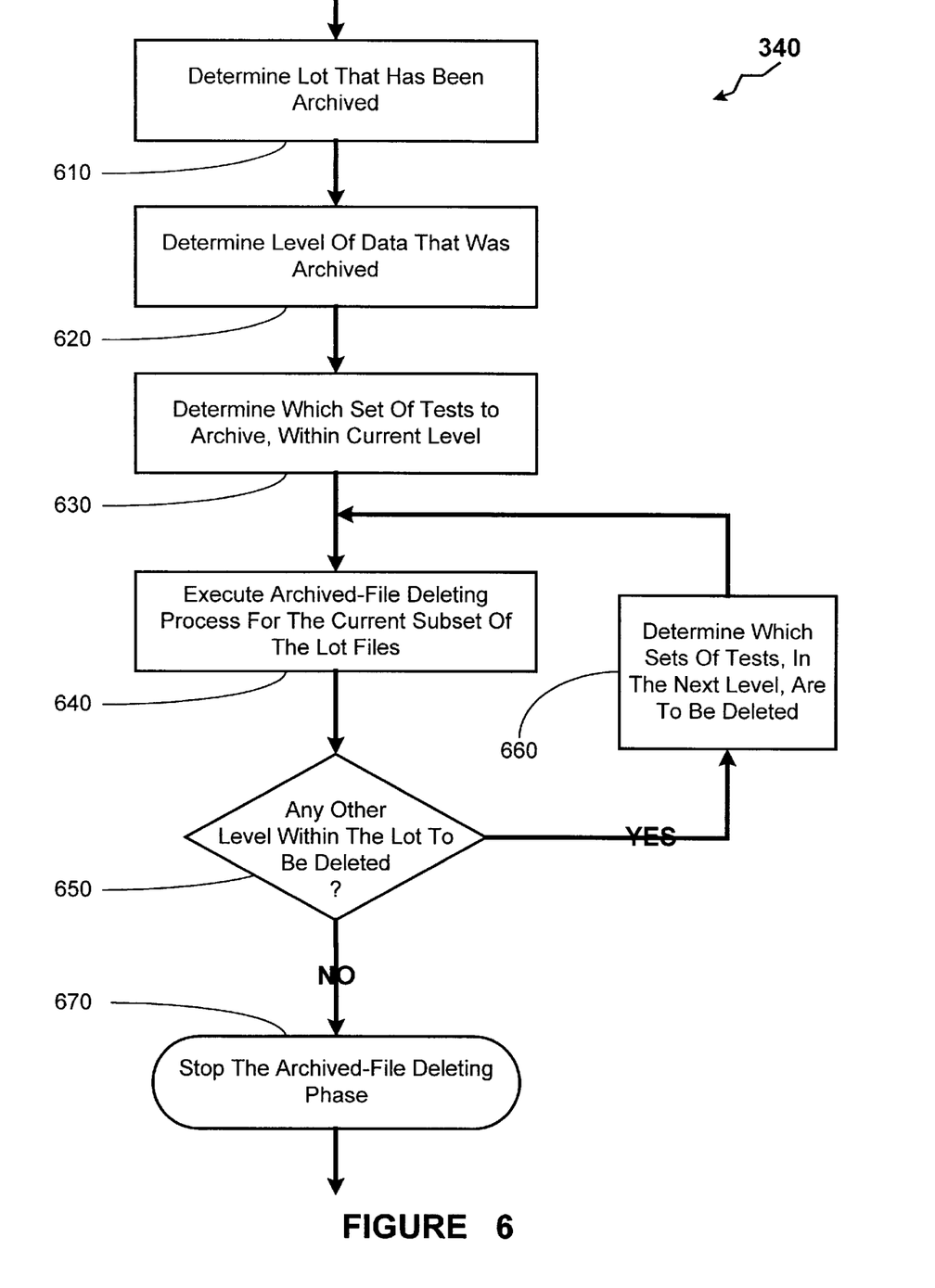
FIG. 6 depicts a more detailed illustrative embodiment of an archiving delete phase described in FIG. 3.

Turning now to FIG. 6, the implementation of the archiving delete phase is initiated by determining a set of data files corresponding to a semiconductor lot that have been archived and are slated to be cleared from the primary database 110, as described by block 610. In one embodiment, the identifiers and locations of data files that have been archived are stored in a file, which is searched by the archiver 120 to determine which lot files, are to be deleted. In one embodiment, the archiving list utilized to determine the lot files to be archived, as described in block 410 of FIG. 4, is also used to determine the lot files that were archived. Once the lot files targeted for deletion are determined, the level of data that was archived is determined, as described in block 620 of FIG. 6. To identify which lot files were archived, the archiver 120 checks the data that was generated during the archiving write phase, particularly during the step of determining the level of data to be archived, described in block 420 of FIG. 4.

When the set of lot files and the level of data that have been archived have been identified, the set of tests for which their respective files have been archived is determined, as described in block 630 of FIG. 6. Generally, for a specified manufacturing lot at a particular data level, a number of different tests are performed, and data associated with these tests are collected and stored. In some embodiments hundreds of tests are performed at an associated data level. The data files resulting from many of the tests are selected for archival. In some embodiments, the data files resulting from all of the tests at a particular data level are archived. In one embodiment, a data query is executed to find and tag all of the data files from the tests that have been archived. At this point, data files associated with a subset of a manufacturing lot have been narrowed to a particular manufacturing lot, further narrowed to a particular data level within the manufacturing lot, and finally narrowed even more to the set of tests, within a particular level. When the data files associated with a subset of a manufacturing lot that have been archived are identified, the archived-file deleting process for the current subset of lot files is executed, as described in block 640.

Figure 7:
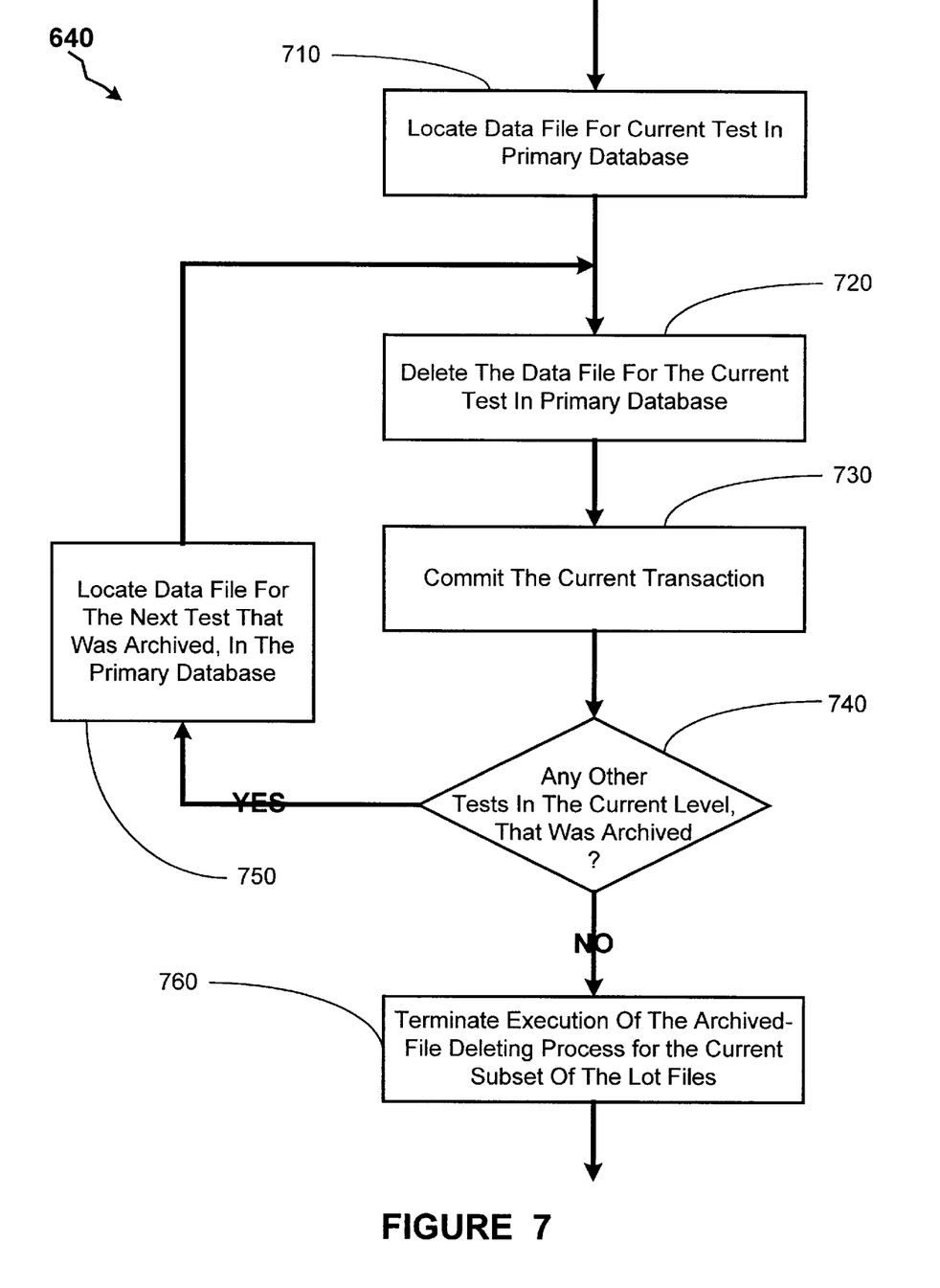
FIG. 7 depicts a more detailed illustrative embodiment of the archive deleting process described in FIG. 6.

The archived-file deleting process, described in block 640 of FIG. 6, is described in further detail in FIG. 7. Turning now to FIG. 7, the currently identified archived test data in the primary database 110 is located, as described in block 710. Once the data file for the current test is located, the data file is deleted from the primary database 110, as described in block 720. Once the data file for the current test is deleted from the primary database 110, the delete transaction must be committed into the system network 130, as described in block 730. In one embodiment, until the current delete transaction is committed into the system network 130, other nodes (not shown) in the system network 130 will not reflect the result of the current transaction. In other words, the deleted file will continue to appear as a non-deleted file on other nodes (not shown) of the system network 130. Furthermore, the delete transaction can be reversed by a system operator on the system network 130. In one embodiment, once the delete transaction is committed into system network 130, the transaction becomes permanent.

When the current delete transaction is committed, the archiver 120 checks to determine whether there are any other test data files that were archived and selected for deletion in the current data level under inspection, as described in block 740 of FIG. 7. When the archiver 120 determines that there are other test data files in the current level that were archived and selected for deletion, the archiver 120 locates the data files in the primary database 110 for the next test that was archived. The archiver 120 then deletes the data file for the next test that was archived from the primary database 110. The delete transaction is then committed and the archiver 120 checks for the presence of any other test data files that were archived. The function loop of deleting the current test data file, committing the delete transaction, checking for other test data files, and locating the next test data file, as described by blocks 720, 730, 740, and 750, is repeated until all of the test data files in the current data level that were archived have been deleted from the primary database 110.

When the archiver 120 determines that the all of the test data files in the current data level that were archived have been deleted from the primary database 110, the archiver 120 terminates the archived-file deleting process, as described in block 760 of FIG. 7. Upon the conclusion of the step described in block 760, the execution of the archived-file deleting process for the current subset of lot files, described in block 640 of FIG. 6, is complete. The archiver 120 then checks to determine whether there are any other data levels within the selected lot that are to be deleted from the primary database 110. When the archiver 120 determines that there are other data levels that contains files that were archived and, therefore, need to be deleted from the primary database 110, the archiver 120 determines which files, that are related to a set of tests from the next data level, are to be deleted, as described in block 660 of FIG. 6. The archiver 120 then executes the archived-file deleting process on the new set of test data files. The archiver 120 then checks for other data levels to determine whether more data files are to be deleted. The function loop of searching for other data levels, locating test data within the data levels, and executing the archived-file deleting process, as described by blocks 640, 650, and 660, are repeated until no other data levels that contain archived files, or files that are to be deleted, are found within the selected lot.

When the archiver 120 determines that no other data levels that contain archived files, or files that are to be deleted, are found within the selected lot, the archiver 120 stops the archived-file deleting process, as described in block 670 of FIG. 6. Once the step in block 670 of FIG. 6 is concluded, the implementation of the archived-file deleting process, described in block 340 of FIG. 3, is complete. When the implementation of the archived-file deleting process is complete, the archiver 120 terminates the archiving process, as described in block 350 of FIG. 3. The archiving process can also be re-initiated when the archiver 120 receives an indication that a data file, even though not archived, has been selected for deletion. The archiving process can be re-initiated when the archiver 120 is provided with an indication that more data has been archived into the archiving destinations 250, and thereby needs to be cleared from the primary database 110. The archiving process is then initiated by the archiver when it determines that the computer resource usage allows the implementation of the archiving process.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method of archiving data files, comprising:
   receiving a command to begin archiving;
   initiating an archiving process directly in response to said command to begin archiving;
   implementing an automatic archiving write phase directly in response to said initiation of said archiving process wherein implementing an archiving write phase comprises:
      determining a manufacturing lot for data archiving;
      determining a data level of the data to be archived, within said determined manufacturing lot;
      determining at least one set of test data for archiving, within said determined data level;
      executing an archive writing process on said determined set of test data;
      determining whether all said data levels from said manufacturing lot is archived;
      determining at least one set of test data within a subsequent data level of said manufacturing lot in response to a determination that all said data levels from said manufacturing lot are not archived;
      executing said archive writing process for said test data corresponding to said subsequent data level of said manufacturing lot; and
      stopping said archiving writing process in response to a determination that all said data levels from said manufacturing lot is archived; and
   implementing an automatic archived-file deleting process directly in response to a completion of said archiving write phase.

2. The method as described in claim 1, wherein receiving a command to begin archiving further comprises receiving a start command from a system network computer.

3. The method as described in claim 1, wherein determining at least one set of test data further comprises executing a data query to locate and tag all test data files to be archived.

4. The method as described in claim 1, wherein executing said archiving writing process further comprises:
   reading at least one test data file corresponding to said data level from said primary database;
   writing said read data file into said archiving destination;
   determining whether all said tagged test data from said data level are archived;
   reading a subsequent test data file within said data level in response to a determination that all said tagged test data from said data level are not archived;
   writing said subsequently read test data file corresponding to said data level into said archiving destination; and
   terminating said execution of said archive writing process for said determined set of test data.

5. The method as described in claim 1, wherein implementing said archived-file deleting process further comprises:
   determining a manufacturing lot that has been archived;
   determining a data level of a data set corresponding to said manufacturing lot, wherein at least one data file from said data level has been archived;
   determining at least one set of test data within said determined data level, wherein at least one data file corresponding to said test data has been archived;
   executing an archived-file deleting process for said determined set of test data;
   determining whether archived data files from all said data levels in said manufacturing lot have been deleted;
   determining at least one set of test data within a subsequent data level of said manufacturing lot in response to a determination that archived data files from all said data levels manufacturing lot are deleted;
   executing said archived-file deleting process for said set of test data corresponding to said subsequent data level of said manufacturing lot; and
   stopping said archived-file deleting process in response to a determination that archived data files from all said data levels in said manufacturing lot are deleted.

6. The method as described in claim 5, wherein determining a manufacturing lot that has been archived further comprises searching a file that contains a list of locations of said archived data.

7. The method as described in claim 5, wherein executing said archived-file deleting process further comprises:
   locating at least one test data file corresponding to said data level from said primary database;
   deleting said located data file from said primary database;
   determining whether all archived test data from said data level are deleted;
   locating at least one subsequent set of test data corresponding to said data level, from said primary database, in response to a determination that all archived test data from said data level are deleted; and
   terminating said archived-file deleting process in response to a determination that that all archived test data from said data level has been deleted.

8. The method as described in claim 5, wherein executing said archived-file deleting process further comprises committing said data file deleting transaction into the primary database.

9. A computer program for archiving data files, comprising the steps of:
   receiving a command to begin archiving;
   initiating an archiving process in direct response to said command to begin archiving;
   implementing an automatic archiving write phase in direct response to said initiation of said archiving process, wherein implementing an automatic archiving write phase comprises the steps of:
      determining a manufacturing lot for data archiving;
      determining a data level of the data to be archived, within said determined manufacturing lot;
      determining at least one set of test data for archiving, within said determined data level;
      executing an archive writing process on said determined set of test data;

determining whether all said data levels from said manufacturing lot is archived;

determining at least one set of test data within a subsequent data level of said manufacturing lot in response to a determination that all said data levels from said manufacturing lot are not archived;

executing said archive writing process for said test data corresponding to said subsequent data level of said manufacturing lot; and stopping said archiving writing process in response to a determination that all said data levels from said manufacturing lot is archived; and implementing an automatic archived-file deleting process in direct response to a completion of said archiving write phase.

10. The computer program as described in claim 9, wherein said step of receiving a command to begin archiving further comprises receiving a start command from a system network computer.

11. The computer program as described in claim 9, wherein said step of determining at least one set of test data further comprises executing a data query to locate and tag all test data files to be archived.

12. The computer program as described in claim 9, wherein said step of executing said archiving writing process further comprises the steps of:

reading at least one test data file corresponding to said data level from said primary database;

writing said read data file into said archiving destination;

determining whether all said tagged test data from said data level are archived;

reading a subsequent test data file within said data level in response to a determination that all said tagged test data from said data level are not archived;

writing said subsequently read test data file corresponding to said data level into said archiving destination; and terminating said execution of said archive writing process for said determined set of test data.

13. The computer program as described in claim 9, wherein said step of implementing said archived-file deleting process further comprises the steps of:

determining a manufacturing lot that has been archived;

determining a data level of a data set corresponding to said manufacturing lot, wherein at least one data file from said data level has been archived;

determining at least one set of test data within said determined data level, wherein at least one data file corresponding to said test data has been archived;

executing an archived-file deleting process for said determined set of test data;

determining whether archived data files from all said data levels in said manufacturing lot have been deleted;

determining at least one set of test data within a subsequent data level of said manufacturing lot in response to a determination that archived data files from all said data levels manufacturing lot are deleted;

executing said archived-file deleting process for said set of test data corresponding to said subsequent data level of said manufacturing lot; and stopping said archived-file deleting process in response to a determination that archived data files from all said data levels in said manufacturing lot are deleted.

14. The computer program as described in claim 13, wherein said step of determining a manufacturing lot that has been archived further comprises searching a file that contains a list of locations of said archived data.

15. The computer program as described in claim 13, wherein said step of executing said archived-file deleting process further comprises the steps of:

locating at least one test data file corresponding to said data level from said primary database;

deleting said located data file from said primary database;

determining whether all archived test data from said data level are deleted;

locating at least one subsequent set of test data corresponding to said data level, from said primary database, in response to a determination that all archived test data from said data level are deleted; and terminating said archived-file deleting process in response to a determination that that all archived test data from said data level has been deleted.

16. The computer program as described in claim 13, wherein said step of executing said archived-file deleting process further comprises committing said data file deleting transaction into the primary database.

17. A method of archiving data files, comprising:

receiving a command to begin archiving;

initiating an archiving process directly in response to said command to begin archiving;

implementing an automatic archiving write phase directly in response to said initiation of said archiving process; and implementing an automatic archived-file deleting process directly in response to a completion of said archiving write phase, wherein implementing said archived-file deleting process comprises:

determining a manufacturing lot that has been archived;

determining a data level of a data set corresponding to said manufacturing lot, wherein at least one data file from said data level has been archived;

determining at least one set of test data within said determined data level, wherein at least one data file corresponding to said test data has been archived;

executing an archived-file deleting process for said determined set of test data;

determining whether archived data files from all said data levels in said manufacturing lot have been deleted;

determining at least one set of test data within a subsequent data level of said manufacturing lot in response to a determination that archived data files from all said data levels manufacturing lot are deleted;

executing said archived-file deleting process for said set of test data corresponding to said subsequent data level of said manufacturing lot; and stopping said archived-file deleting process in response to a determination that archived data files from all said data levels in said manufacturing lot are deleted.

18. The method as described in claim 17, wherein determining a manufacturing lot that has been archived further comprises searching a file that contains a list of locations of said archived data.

19. The method as described in claim 17, wherein executing said archived-file deleting process further comprises:

locating at least one test data file corresponding to said data level from said primary database;

deleting said located data file from said primary database;

determining whether all archived test data from said data level are deleted;

locating at least one subsequent set of test data corresponding to said data level, from said primary database, in response to a determination that all archived test data from said data level are deleted; and terminating said archived-file deleting process in response to a determination that that all archived test data from said data level has been deleted.

20. The method as described in claim 17, wherein executing said archived-file deleting process further comprises committing said data file deleting transaction into the primary database.

21. A computer program for archiving data files, comprising the steps of:

receiving a command to begin archiving;

initiating an archiving process in direct response to said command to begin archiving;

implementing an automatic archiving write phase in direct response to said initiation of said archiving process; and implementing an automatic archived-file deleting process in direct response to a completion of said archiving write phase, wherein implementing said automatic archived-file deleting process comprises the steps of:

determining a manufacturing lot that has been archived;

determining a data level of a data set corresponding to said manufacturing lot, wherein at least one data file from said data level has been archived;

determining at least one set of test data within said determined data level, wherein at least one data file corresponding to said test data has been archived;

executing an archived-file deleting process for said determined set of test data;

determining whether archived data files from all said data levels in said manufacturing lot have been deleted;

determining at least one set of test data within a subsequent data level of said manufacturing lot in response to a determination that archived data files from all said data levels manufacturing lot are deleted;

executing said archived-file deleting process for said set of test data corresponding to said subsequent data level of said manufacturing lot; and stopping said archived-file deleting process in response to a determination that archived data files from all said data levels in said manufacturing lot are deleted.

22. The computer program as described in claim 21, wherein said step of determining a manufacturing lot that has been archived further comprises searching a file that contains a list of locations of said archived data.

23. The computer program as described in claim 21, wherein said step of executing said archived-file deleting process further comprises the steps of:

locating at least one test data file corresponding to said data level from said primary database;

deleting said located data file from said primary database;

determining whether all archived test data from said data level are deleted;

locating at least one subsequent set of test data corresponding to said data level, from said primary database, in response to a determination that all archived test data from said data level are deleted; and terminating said archived-file deleting process in response to a determination that that all archived test data from said data level has been deleted.

24. The computer program as described in claim 21, wherein said step of executing said archived-file deleting process further comprises committing said data file deleting transaction into the primary database.

* * * * *